United States Patent Office 3,459,565
Patented Aug. 5, 1969

3,459,565
FOAMABLE GRANULE PRODUCT WITH METHOD
OF PREPARATION AND MOLDING
Giffin D. Jones and William J. McMillan, Midland,
Mich., assignors to The Dow Chemical Company,
Midland, Mich., a corporation of Delaware
No Drawing. Continuation-in-part of applications Ser. No.
204,048, June 19, 1962, Ser. No. 510,418, Oct. 1, 1965,
and Ser. No. 523,528, Jan. 28, 1966. This application
Mar. 13, 1967, Ser. No. 622,459
Int. Cl. C03b *19/08;* C03c *3/04*
U.S. Cl. 106—40       8 Claims

ABSTRACT OF THE DISCLOSURE

A method of preparing an unfoamed, foamable glass mass containing undissolved, entrapped, compressed gas which comprises melting a glass mass under at least 100 p.s.i. pressure of an inert gas, and maintaining said pressure during cooling until said mass has solidified.

---

This application is a continuation-in-part of copending applications Ser. No. 523,528, now abandoned, filed Jan. 28, 1966, and Ser. No. 510,418, now abandoned, filed Oct. 1, 1965. Parent application Ser. No. 523,528, is in turn a continuation-in-part of Ser. No. 204,048 now abandoned, filed June 19, 1962.

It is an object of the present invention to provide a novel solid essentially unfoamed foamable granule which is substantially non-friable, vitreous, may be readily handled and shipped, and which is infinitely storable.

Another object of the invention is to provide a novel method of synthetically preparing a solid unfoamed foamable granule.

A further object of the invention is to provide a method of molding foamable granules as defined herein in a mold to provide a shaped molded foamed inorganic article of low density and uniform small cell size.

In accordance with the present invention, solid unfoamed foamable granules are prepared by (1) heating a comminuted inorganic glass-forming material mixture having a silicon dioxide content of at least about 50 weight percent under a gas pressure of at least about 100 p.s.i. at a temperature sufficient to melt the inorganic glass-forming mixture into a vitreous mass and entrap compressed interstitial gas, and (2) cooling the vitreous mass to a temperature sufficient to solidify the same while maintaining such mass under a pressure of at least about 100 p.s.i., thereby to produce a solid glass-like unfoamed foamable product which, as an optional additional step in the process, may be ground to suitably sized foamable granules of, e.g. from about 1/20″ to about 1″, preferably 1/8″ to 1/2″.

As a unique product, the solid unfoamed foamable pressurized granules of the present invention are characterized as an essentially unfoamed glass-like solid which may be foamed upon subsequent heating, the solid granule having a density approaching that of vitreous glass. For example, solid unfoamed granules made in accordance with the present invention employing about 1000 p.s.i. pressure both during the heating and cooling operations have a density of about 2.035 grams per cubic centimeter, or about 90 percent that of the vitreous silica (2.295 gm./cc. density). In any event these unique unfoamed, foamable glass-like masses or granules are normally characterized by a density of at least about 2.0 grams per cubic centimeter. In appearance these granules essentially resemble poorly fined glass particles and upon microscopic examination are somewhat more opaque than ordinary glass. These synthetic unfoamed foamable granules have the advantage of being essentially non-friable, indefinitely storable, and shippable without damage or hazard. A potential user may order such granules in bulk, and use as necessary without fear of damage and the like. Moreover, large voluminous storage areas are not required, as would be in storing a foamed material.

The term "glass-forming materials" as used herein refers to a composition which contains at least about 50 weight percent silicon dioxide, the balance being composed essentially of one or more other glassforming substances. The chemical composition of the glass is given in terms of boric oxide, phosphorous pentoxide, germanium oxide and the like, and/or minor amounts of one or more glass modifiers such as potassium oxide, sodium oxide, calcium oxide, magnesium oxide, and the like. These compositions are produced by using such chemicals as borax, calcium phosphate, sodium or potassium or calcium carbonate and magnesium oxide. The glassforming materials used herein as defined may either be in crystalline or in vitreous form.

Any comminuted inorganic glass-forming material which contains at least about 50 percent silicon dioxide is applicable as a starting material in making the synthetic solid unfoamed foamable material of the present invention. When the silicon dioxide content is below the indicated level, the resultant foamed product is generally at least partially soluble in water and less stable to chemicals and thermal shock.

It is often advantageous to subject foamed articles produced from the foamable material of the present invention, containing less than about 99 weight percent silicon dioxide, to temperatures sufficient to anneal the same following formation thereof to obtain maximum strength properties. It is normally unnecessary to anneal foamed articles produced from foamable glass containing at least about 99 weight percent silicon dioxide.

Examples of typical commercial inorganic glassforming materials that may be employed in the practice of the invention to make the present novel solid unfoamed foamable mass or granule are shown in the following Table I. Vitreous silica which is non-crystalline, e.i. ground fused quartz, can also readily be employed in the invention.

TABLE I

|  | A | B | C | D | E |
|---|---|---|---|---|---|
| $SiO_2$ | 99 | 96 | 80 | 51 | 60.2 |
| $Al_2O_3$ | 0.07 |  | 2 |  | 3.8 |
| CaO | 0.04 |  | .06 | 14 | 0.8 |
| MgO | 0.0005 |  |  | 3.4 |  |
| $Fe_2O_3$ | 0.03 |  |  | 9.7 |  |
| $B_2O_3$ |  | 3 | 14 |  | 25.8 |
| $Na_2O$ |  |  | 3.56 |  | 7.8 |
| $K_2O$ | 0.013 |  | 0.38 |  | 1.6 |
| $TiO_2$ | 0.008 |  |  |  |  |
| $PbO_2$ | 0.002 |  |  |  |  |
| Soft. p | [1] 1,650 | 1,500 | 819 |  |  |

[1] After fusion.

Generally, it is preferable in the practice of the invention, that the comminuted inorganic glass-forming material be of a very fine texture, approaching that of a powder. Beneficially, the glass-forming material should be sized to pass at least a 50 mesh screen, and preferably a screen between 200 and 325 mesh. Larger sized particles may be used but lower expansion and larger cells may result in the resultant foam.

The temperature that must be used in heating the comminuted inorganic glass-forming material is that which is at least the softening point of the material. Generally, it is preferred to heat such materials using the lowest possible temperatures to minimize migration of any compressed gas within the heated mass.

Temperatures between about 600° C. and 1800° C. are generally sufficient to melt the materials described herein, depending for the most part upon the silicon dioxide content of the material. It is generally preferred to melt materials composed essentially of silicon dioxide, that is, materials having a silicon dioxide content of about 99 weight percent at temperatures of about 1650° C. to 1750° C.

The temperature required to melt the comminuted inorganic glass-forming material may be lowered by intimately admixing with the glass-forming material prior to melting of the same, of small amounts of glass-modifiers which do not induce excessive divitrification. Representative of such glass-modifiers are boric oxide and certain coloring agents such as cobalt oxide.

In order to obtain the uniform, small, closed cell foam upon subsequently heating the solid unfoamed foamable granules made in accordance with the invention, the inorganic glass-forming material must of necessity be pressurized with a suitable gas prior to being melted. Ordinarily, a gas pressure of at least 100 p.s.i. is employed, and preferably, between about 200 p.s.i. and 800 p.s.i. is utilized for superior uniformness of cell structure through the resultant foam. Because of the reactivity of many gases with the materials of construction in the furnace or enclosed chamber in which the material is fused, inert gases such as nitrogen and argon are preferably employed. However, many other gases such as carbon dioxide, ammonia, and suitable mixtures thereof, among others may be employed.

It is to be noted that many of such gases are known to be somewhat soluble in the glass-forming materials described herein. Thus, in the practice of the present invention, the cooled, pressurized solid unfoamed vitreous mass will contain dissolved gases in addition to compressed undissolved gases. It is not possible, however, to introduce an adequate amount of gas into the mass after melting. In any event the solid unfoamed foamable material should contain sufficient gas or gases to expand such material at least about two and preferably five volumes upon subsequently heating same to elevated temperatures, e.g. in a mold, at normal atmospheric pressures.

It is also to be noted that cellulation of the final foamed product may be somewhat enhanced by intimately admixing with the comminuted inorganic glass-forming material prior to melting, small amounts of a conventional gas generating substance. However, such cellulating agents are not essential in the present invention.

Carbon black is an example of such a gas generating substance and may be employed in a range of, for example, 0.01 to 0.5 weight percent and preferably between 0.05 and 0.2 weight percent based on the weight of the glass-forming material, dependent upon the degree of cellulation desired. It, too, should be in very finely pulverized or pigmentary form, for example, wherein at least 95 percent of the charge may be passed through a 325 mesh screen. Other finely pulverized carbon or carbonaceous material such as powdered coal may also be mixed with the solid comminuted inorganic glass-forming mixture of the present invention in amounts of between 0.01 and 0.5 percent by weight, dependent somewhat upon the degree of cellulation desired and the material employed.

Other commonly used gas-generating substances found to be suitable for the purposes of the present invention include, but are not restricted to, inorganic carbonates, i.e. magnesium carbonate; silicon monoxide, metals, i.e. silicon metal, silicic acid, magnesium nitride, and suitable mixtures thereof. Typically about 5 weight percent of substances of these types would be added.

In a preferred embodiment of the method of the present invention for preparing synthetic solid unfoamed foamable granules, a comminuted inorganic glass-forming quartz material in a mesh size of from about −200 to about +325 mesh, having a composition as set forth in Example I, is enclosed in a chamber or mold cavity and pressurized by a gas such as nitrogen or argon either in or about the mold cavity preferably to at least about 200 p.s.i. to form a pressurized vitreous mass, and cooling the mass under at least 200 p.s.i. of pressure to solidify same, and optionally granulating the cooled mass to produce synthetic solid unfoamed but foamable granules. In general, the operating conditions of the method of the present invention for making granules should be adjusted sufficient to cause expansion of the granules when subsequently reheated and foamed at least about two volumes and preferably five volumes, at normal atmospheric pressure.

Synthetically prepared foamable granules, such as the novel solid unfoamed foamable granules prepared by the method of the present invention, and other synthetic foamable granules not necessarily prepared in accordance with the present invention, which may be stored until needed then foamed and cast in a mold to successfully make low density, shaped, foamed articles conforming in dimension closely to a mold cavity, have heretofore been unknown.

These synthetically prepared, foamable granules, including the solid unfoamed pressurized, foamable granules of the present invention may be heat foamed or expanded and molded in a closed mold to form a foamed glass article of predetermined density. In this process heat foamable granules are introduced into a closed cavity of a mold and the mold and contents heated to effect foaming. The foamed mass is cooled at least to a point where its structure is essentially rigid enough to be self-supporting whereupon it may be removed from the mold, annealed in an oven and/or further cooled to room temperature. The amount of foamable granules to be introduced into the mold may be predetermined and are dependent primarily upon the desired density of the foam. The size of the granules should be small with respect to the smallest interstices of the mold and preferably at least as fine as ⅛ to ½ inch.

When a borosilicate foam is prepared, carbonates such as sodium and potassium carbonate, are desirable additives, giving low density moldings (below 10 lbs. ft.$^{-3}$). The carbonates are added at about 5% by weight. When carbon or silicon is used as an auxiliary blowing agent the amount is kept much smaller (less than 0.5%) in order to get a white foam. Pressurization is preferably conducted, e.g. at 1200° C. and molding is preferably done at 775–825° C.

The temperature that must be used to cause the solid pressurized vitreous mass to expand is that which is at least the softening point of the mass. Generally, temperatures ranging from about 60 centigrade degrees above the annealing point of the mass (A.S.T.M. designation C 336) to about 300° C. above the softening point of the mass (A.S.T.M. designation C 338) are employed. These temperatures generally provide a mass having a viscosity between $10^5$ and $10^{12}$ poises. The preferable viscosity range being between about $10^6$ and $10^{7.5}$ poises. Generally, foaming temperatures between about 600° C. and 1800° C. are employed.

Although the solid, glass-like, unfoamed, foamable, pressurized glass granules produced by the method of the present invention are very satisfactory for carrying out the molding process, it is to be understood that any of a variety of heat foamable glass granules can be molded in accordance with the presently disclosed molding process. For example, in addition to the solid unfoamed foamable granules prepared by the process disclosed herein, molded foamed articles can be fabricated using synthetic glass compacted granules produced in the following manner: A particulated glass mixture is provided comprising (1) a pulverised glass containing at least about 50 weight percent of $SiO_2$ whose softening point is between about 700° C. and about 1800° C., (2) one or more gasing agents capable of producing gases over the foaming temperature range where the molten glass mixture has a viscosity of e.g. from about $10^{5.6}$ to about $10^{8.1}$ poises, and (3) a water soluble binder material which preferably becomes a component of the glass during the molding and foaming operation, is provided in particle size the particles of which preferably do not exceed 50 mesh U.S. Standard Sieve and preferably contain particles at least 50% of which are as fine or finer than 400 mesh. This glass mixture is admixed with a liquid such as water, compacted, e.g. in an inclined pan granulator, and dried into foamable compacts of pellets or balls having a size preferably of from about ⅛ to 1 inch in cross-section, said pellets having an apparent density of at least 50% of the absolute density of the glass mixture being employed. The resulting pellets are used in the novel molding process described directly hereinbefore.

Foams obtained from these compacted materials are characterized by cells of size less than 3 mm. but normally not as fine as those obtained with the previously described pressurized glass granules.

Thus, a highly advantageous and beneficial foamed glass may be produced having excellent and superior properties, particularly in regard to the manufacture of articles such as structural materials requiring strength, resistance to weathering, impermeability to water and other liquids and having smooth easily cleaned finished facings.

Still another advantageous characteristic of foamed glass derived from the present invention is the essential absence of a gray or black color commonly observed in conventionally prepared foams since cellulating agents are not required. Thus, various coloring agents may be incorporated in the comminuted inorganic glass-forming materials to form foamable granules for producing brightly colored expanded molded articles. If carbon is used, however, it can be used so efficiently as to be consumed leaving no black residue.

As purely exemplary of foamed articles derived from the present invention are: structural blocks, planks, panels and the like for exterior use, insulating board, and expanded vitreous pellets and articles made by fusing together such expanded vitreous pellets. Such articles are characterized by having a cell size less than 1 millimeter and generally less than 0.3 millimeter, at least 80 percent closed cells and often 100 percent closed cells, and a density of less than about 60 pounds per cubic foot and generally less than 20 pounds per cubic foot. These articles also have an essentially smooth facing surface and when such articles are formed in a mold a durable skin is formed on their outer surfaces, such skin having an integrity of structure and strength characteristic of a laminate.

Foamed articles derived from the present invention can be cemented together with additional bonding agents, fillers, or reinforcing wire or fibrous materials to produce articles having a much stronger bond than articles produced by cementing particles of a ground or cut foam. Preferentially, such bonding agents, fillers, or reinforcing wire should have a coefficient of expansion similar to that of the expanded article into which they are incorporated. Additionally, expanded pellets can advantageously be used to surface concrete in color or to surface a tar roof in color without sinking. Foamed pellets as described herein, as well as articles formed by fusing together such foamed pellets may also be useful for applications combining buoyancy and impermeability in water.

The foamable granule or granules, which include the pressurized unfoamed foamable granules of the invention and the disclosed compact foamable granules as well as any other foamable granules regardless of how made, which may be molded and foamed in a closed mold in accordance with the present invention are defined herein as unfoamed, stable, vitrifiable, synthetically prepared, densified, foamable, discrete masses, having a silicon dioxide content of at least about 50 weight percent, and containing means for expanding said mass on heating homogeneously distributed throughout said mass, which mass on heating to a temperature of preferably at least about 600° C. foams to substantially homogeneous cellular structure.

The following examples, wherein all parts and percentages are to be taken by weight, illustrate the present invention but are not to be construed as limiting its scope.

Example 1

In each of a series of experiments individual charges of quartz having the following compositions by weight were comminuted to a particle size sufficient to pass through a 325 mesh screen and were individually melted under pressure in a furnace containing a nitrogen or argon inert atmosphere.

| Ingredient: | Percent |
| --- | --- |
| $SiO_2$ | 99 |
| $Al_2O_3$ | 0.07 |
| CaO | 0.04 |
| MgO | 0.0005 |
| $Fe_2O_3$ | 0.03 |
| $K_2O$ | 0.013 |
| $TiO_2$ | 0.008 |
| $PbO_2$ | 0.002 |

Each pressurized, metal mass was individually solidified by cooling to normal room temperature in the furnace at the same pressure employed during heating.

Table II shows the conditions used for melting under pressure and cooling under pressure.

TABLE II

| Sample | Fusing conditions | | | | |
| --- | --- | --- | --- | --- | --- |
| | Max. temp. (° C.) | Gas | Pressure, p.s.i. | Time [1] | Cooling pressure |
| 1 | 1,707 | $N_2$ | 1,000 | 70 | 1,000 |
| 2 | 1,700 | $N_2$ | 750 | 120 | 750 |
| 3 | 1,760 | Argon | 1,000 | 60 | 1,000 |
| 4 | 1,720 | $N_2$ | 500 | 105 | 500 |

[1] Time above 1,650° C. in minutes.

Solid unfoamed foamable vitreous masses were obtained having a glass-like appearance and densities such as, e.g. 2.15 g./cc. in sample (1) one. The density of a sample of the fused quartz not melted and pressurized in accordance with the present invention was determined to be 2.295 g./cc., thus the above solid foamable mass had a density of 94% of the solid fused quartz.

Example 2

A charge of the composition of Example 1 was mixed with 0.1 weight percent lampblack and was heated in a high pressure furnace at a temperature of between 1750° C. and 1760° C. for one hour under 800 p.s.i. of nitrogen pressure, then cooled to room temperature at the same pressure. The mass was ground to granules which had a density of 2.04 g./cc. or 89% of theoretical solid glass density.

Example 3

A charge of the composition of Example 2 including the 0.1 weight percent lampblack was heated in a high pressure furnace for 1 hour at a temperature of 1750° C. under 600 p.s.i. nitrogen pressure. The mass was cooled to room temperature at the same pressure and ground to granular form. The density of the unfoamed foamable granules was 2.02 g./cc. of 88% of theoretical.

Example 4

A charge of the composition of Example 1 was mixed with 0.1 weight percent lampblack. The mixture was heated to 1750° C. for 1 hour in a high pressure furnace under 500 p.s.i. nitrogen pressure, then cooled under the same pressure. The final ground foamable granules had a density of 2.10 g./cc. or 91.5% of theoretical.

Example 5

A quartz charge of the composition described in Example 1 was mixed with 0.1 weight percent lampblack and was subsequently heated and melted in a high pressure furnace operating at 1800° C. under 600 p.s.i. of nitrogen pressure for one hour, then cooled to room temperature in the furnace at the same pressure, and when cool, ground to a particle or granule size of −10 +16 mesh. The granules were solid unfoamed foamable discrete masses having a density similar to that of Example 1, i.e. 2.15 g./cc.

About 47 grams of the granules were placed in a graphite mold the dimensions of which were 1 inch by 1 inch by 6 inches, and which allowed expansion against a back pressure. The granules were heated for one hour at atmospheric pressure and a temperature of about 1675° C. After cooling, a well molded, white, foamed article having substantially all closed, uniformly spaced, fine cells, a smooth skin-like exterior surface, and a density of about 27 pounds per cubic foot was obtained.

Example 6

An inorganic glass-forming material having the following weight composition and a softening point of about 819° C. was ground up to pass a 325 mesh screen and was subsequently melted in a high pressure furnace at 1200° C. under 500 p.s.i. of $CO_2$ pressure for one hour.

|  | Percent |
| --- | --- |
| $SiO_2$ | 80 |
| $Al_2O_3$ | 1.8 |
| $B_2O_3$ | 13.0 |
| $Na_2O$ | 4.3 |
| $K_2O$ | 0.4 |
| Other | 0.5 |

The resultant solid unfoamed foamable mass was subsequently heated at a temperature of 965° C. for five minutes to form a white foam-like article having a cell size of from 0.1 to 0.8 millimeter and a density of 8 pounds per cubic foot.

Example 7

A commercially accepted soft glass having a silicon dioxide content of about 50 percent was ground to a particle size sufficient to pass through a 200 mesh screen and melted in a furnace operating at 1000° C. under 500 p.s.i. nitrogen pressure for a period of two hours. The melted mass was cooled in the pressurized furnace to normal room temperatures and subsequently reheated at atmospheric pressure. Foaming began at temperatures between 630° C. and 700° C. with a total foaming time of less than one-half hour. The resulting foamed article was nearly white with a very pale yellow cast, a density of 24 pounds per cubic foot, and a cell size essentially between 0.1 and 0.3 millimeter.

Example 8

A quartz charge having a composition as described by Example 1, was admixed with 0.1 weight percent lampblack and melted in a furnace operating at a temperature of 1750° C. under 100 p.s.i. nitrogen for a period of one hour. The resulting pressurized mass was cooled in the pressurized furnace to normal room temperatures to provide a solid unfoamed foamable mass which was subsequently ground to a particle size sufficient to allow the individual granules to pass through a 10 mesh screen and to be retained on a 16 mesh screen. The granules were then reheated at atmospheric pressure at a temperature of 1650° C. for a period of ten minutes, to form white foamed pellets having a density of about 31.5 pounds per cubic foot.

Example 9

A quartz charge having the composition as described by Example 1 was mixed with lampblack (0.1%) and melted at 1750° C. for 1 hour under 500 p.s.i. nitrogen pressure. The melt was cooled without releasing the pressure. The glass was crushed and screened. The portion retained on a 12 mesh screen but passing through an 8 mesh screen was molded at 1600° C. for 0.5 hour in a graphite mold (1⅛ x 1⅛ x 5 inch). A molding temperature above 1650° was used to produce a white foam having a large cell size. Prefoaming at 1450° for 10 minutes produced bulk density foams of 20 to 30 lbs. ft.$^{-3}$. Foam moldings having 25 lbs. ft.$^{-3}$ were made by using either unfoamed or prefoamed granules or a mixture of both.

Example 10

A composition was prepared by mixing 71.69 parts silica, 13.08 parts sodium tetraborate-5 $H_2O$, 7.14 parts boric oxide and 8.09 parts nepheline syenite. Analysis of the nepheline syenite gave the following: 60.4% silica, 23.6% alumina, 9.8% soda, 4.6% potash.

A quantity of the above composition was heated in a furnace operating at 1200° C. under 500 p.s.i. nitrogen pressure for one hour. The material was cooled under the same pressure and subsequently ground. The unfoamed, foamable granules were then sized by screening.

A 78.9 gram quantity of the foamable granules in a size range of minus 8, plus 12 U.S. mesh was placed in the bottom of a 2 inch x 2 inch x 10 inch stainless steel rectangular mold. The mold and granules contained therein were placed in an oven at 900° C. for 15 minutes, at which time they were removed and allowed to cool. The mold was opened to reveal a well defined block of foamed glass with a density of 6.9 lb./ft.$^3$.

Example 11

Using the same mold and foamable granules as in Example 10 the molding method was repeated with an added annealing step. 158 g. of the foamable granules were placed in the assembled mold. The mold and contents were placed in an oven at 840° C. for 15 minutes. The mold and foamed contents were removed from the oven and placed in an oven at 650° C. In 50 minutes the temperature of the oven had dropped to 575° C. at which time the mold was stripped from the foamed glass block. The annealing continued for another 70 minutes at which time the foamed block was removed from the oven at a temperature of 400° C. The foamed glass block was a well molded strong sample with a density of 11.9 lbs./ft.$^3$.

Example 12

The following materials were well mixed in a Muller mixer:

50 pounds ferro glass No. 3124
5 pounds calcium carbonate
13 pounds 5 percent gum arabic in water solution as a binder Ferro glass No. 3124 has the following composition by weight: 14.1% CaO, 0.7% $K_2O$, 6.3% $Na_2O$, 9.9% $Al_2O_3$, 13.7% $B_2O_3$, 55.3% $SiO_2$.

The mud material from the Muller was balled or compacted into foamable granules in a rotating pan granulator with a heated retaining edge. The compacts were screened to a size of between 0.371 and 0.5 inch, dried in an air oven at 150° C. for one hour and then exposed for four minutes in an 830° C. oven to burn out the binder. So-prepared the compacts had an apparent density of over 50 percent of the absolute density of the glass mixture being employed.

Molding was carried out by taking such balls out of storage, putting a predetermined amount into a 2 x 3 x 6 inch mold, and heating for 16 minutes at 800° C. The balls foamed and filled the mold. The molding was annealed for one hour at 435° C. and cooled at the rate of 2° C. per minute. The foamed article has the following physical properties:

| | |
| --- | --- |
| Density lb./ft.$^3$ | 9.42 |
| Cell size mm | 0.6 |
| Percent open cell (approx.) | 18 |
| Compressive strength p.s.i. | 129.6 |

What is claimed is:

1. A method for preparing a solid, glass-like, unfoamed, foamable, pressurized mass comprising: heating a comminuted inorganic glass-forming material having a silicon dioxide content of at least about 50 weight percent under an applied gas pressure of at least 100 p.s.i. of a gas which is essentially unreactive with said glass-forming material to a temperature sufficient to melt said material into a vitreous mass containing said gas undissolved but entrapped and compressed therein and, maintaining said vitreous mass under an applied gas pressure of at least about 100 p.s.i. until said mass has cooled to a solidified, pressurized, essentially gas impermeable, unfoamed but foamable glass-like material containing undissolved, entrapped, compressed gas.

2. The method of claim 1 wherein said applied gas pressure is maintained between about 200 to about 800 p.s.i. during melting of the comminuted inorganic glass-forming material and cooling of said unfoamed, foamable, vitreous mass.

3. The method of claim 1 including the additional step of granulating the solidified, vitreous, pressurized material.

4. A method of producing a foamed cast article conforming in shape to the mold cavity configuration in which cast consisting essentially of: introducing unfoamed, synthetically prepared, discrete, foamable granules containing undissolved, entrapped, compressed gas and having a silicon dioxide content of at least about 50 weight percent and containing means for expanding upon heating said discrete granules distributed homogeneously throughout into a closed mold in a predetermined amount upon foaming to fill said mold cavity; heating said mold and contents at least to the softening point of the granules to effect foaming of said discrete, unfoamed, foamable granules, thereby to provide a foamed cast article conforming in shape to the mold cavity.

5. A method of heat forming a foamed glass article comprising: introducing unfoamed, foamable, discrete granules containing undissolved, entrapped, compressed gas into a mold cavity in an amount to obtain upon foaming a foamed glass article of a predetermined density and a shape conforming substantially to the mold cavity configuration, closing the mold containing said granules, heating said mold and contents to a temperature of from about 600° C. to about 1800° C. to effect foaming of the granules, and cooling the foamed article resulting at least to a point where its structure is substantially rigidly self-supporting.

6. A solid pressurized, unfoamed, vitreous, foamable mass having a silicon dioxide content of at least 50 weight percent containing undissolved entrapped, compressed gases.

7. The solid, pressurized, unfoamed, foamable mass of claim 6 containing a small amount of a gas-generating substance capable of generating gas at a temperature sufficient to soften said solid vitreous mass.

8. The unfoamed, foamable, pressurized mass of claim 6 characterized by having a density of at least about 2.00 grams per cubic centimeter.

References Cited

UNITED STATES PATENTS

| | | | |
|---|---|---|---|
| 2,322,581 | 6/1943 | Lytle | 65—22 |
| 2,736,142 | 2/1956 | Baumler et al. | 65—22 |
| 3,355,273 | 11/1967 | Siegmund et al. | 65—4 |

S. LEON BASHORE, Primary Examiner

E. R. FREEDMAN, Assistant Examiner

U.S. Cl. X.R.

65—21, 22, 32; 106—41, 52